April 30, 1963 S. A. COGSDILL 3,087,359
DEBURRING TOOL
Filed Feb. 9, 1961
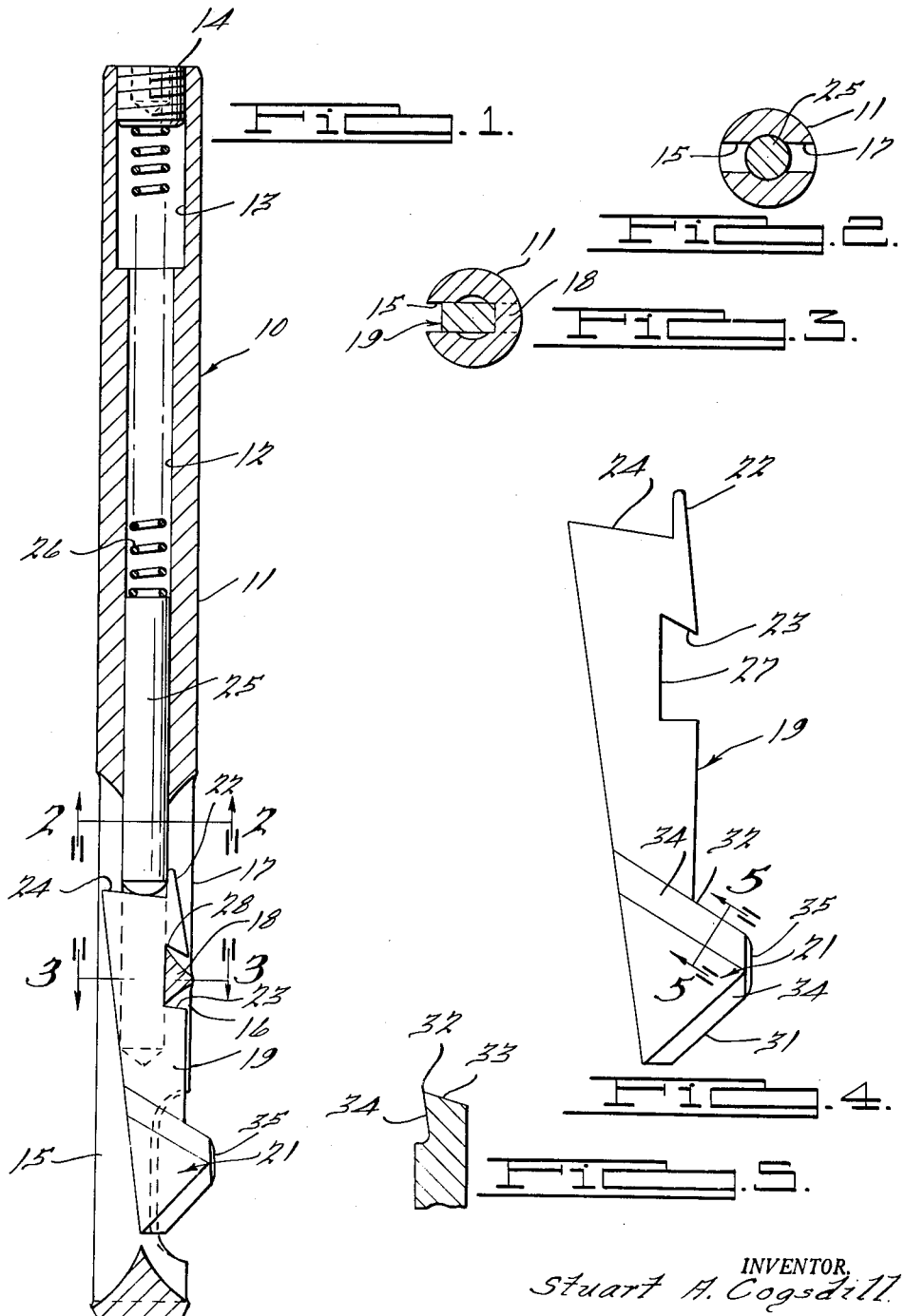
INVENTOR.
Stuart A. Cogsdill
BY
Karness, Dickey & Pierce
ATTORNEYS

United States Patent Office 3,087,359
Patented Apr. 30, 1963

3,087,359
DEBURRING TOOL
Stuart A. Cogsdill, Orchard Lake, Mich., assignor to Cogsdill Tool Products, Inc., Detroit, Mich., a corporation of Michigan
Filed Feb. 9, 1961, Ser. No. 88,206
7 Claims. (Cl. 77—73.5)

This invention relates to deburring tools and particularly to a deburring tool having a blade which is readily separable from the tool body.

The patent to Stuart A. Cogsdill, No. 2,620,689, issued December 9, 1952, discloses a deburring tool having a slender body for entering a small aperture and cutting a burr from the edges thereof. A blade is illustrated having an aperture through which a pin extends to permit the blade to pivot and move the cutting end outwardly and inwardly of the body of the tool. The blade was constructed to cut with a forward edge alone or with the rearward edge alone or with both. The remaining portions of the blade may be rounded off both laterally and longitudinally thereof to form nonmarring camming surfaces.

The tool of the present invention comprises a rodlike body having a slot extending diametrically through the body at the forward end except for a bridging bar at one side thereof. The blade pivots about the bridging bar when disposed within the slot. A bore on the axis of the body at the opposite end thereof supports a plunger which is spring pressed to engage an edge of the blade and swing the cutting head thereof outwardly of the body. An adjusting screw in the end of the body tensions the spring a desired amount.

The blade has a notch in the side wall which extends over the bridging bar and is so shaped as to be secured against accidental separation therefrom. The spring pressed plunger engages the end of the blade at one side of the bridging bar in position to swing the opposite end of the blade and the cutting head outwardly of the body. This movement is limited by a finger on the end of the blade which engages the side of the plunger. The cutting edge of the blade is relieved at the ends to provide end clearance and on the face to provide a positive rake angle which produces smooth cutting on each side of an aperture through which the body is advanced. A burr is usually formed on one or both faces of a sheet of material when a hole is drilled, punched or otherwise formed therein. If it is found that a burr is produced only on one face of the material, then the cutting edge need only be provided on the portion of the blade which will be in engagement therewith.

Accordingly, the main objects of the invention are: to provide a deburring tool with a blade having a notch engageable with a bridging bar to permit the blade to pivot and be readily removed from the body; to form a slot through a rodlike body communicating with a bore and bridged by a bar which forms a pivot about which a blade is urged by a spring pressed plunger disposed within the bore; to provide a slot for a blade in the body of a deburring tool by sinking a cutter on a diameter from one side of the body and moving the cutter along the body to produce length to the slot and sinking cutters on the same diameter from the opposite side to extend the slot through the body while providing a bridging bar across one edge of the slot, and, in general, to provide a deburring tool which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a sectional view of a deburring tool embodying features of the present invention;

FIG. 2 is a sectional view of the structure illustrated in FIG. 1, taken on the line 2—2 thereof;

FIG. 3 is a sectional view of the structure illustrated in FIG. 1, taken on the line 3—3 thereof;

FIG. 4 is an enlarged view of the blade for the deburring tool illustrated in FIG. 1, and FIG. 5 is an enlarged broken sectional view of the structure illustrated in FIG. 4, taken on the line 5—5 thereof.

The deburring tool 10 has a cylindrical body portion 11 containing a central aperture 12 which is enlarged at 13 and threaded for receiving a threaded plug 14 which is adjustable therein. The cutting end of the body 11 has a slot 15 machined on the diameter from one side of the body and a pair of slots 16 and 17 disposed in the plane of the slot 15 from the opposite side of the body. Between the slot portions 16 and 17, a bridging bar 18 is left remaining for securing a blade 19 within the slot through the body.

The blade has a cutting head 21 on one end and a stop finger 22 on the other end. A notch 23 extends within the body on the side of the blade from which the cutting head 21 projects. The notch 23 extends over the bridging bar 18, as illustrated in FIG. 1, on which it is retained against endwise movement and pivoted outwardly by a force applied to the end 24. A plunger 25 is disposed within the aperture 12 of the body urged by a coil spring 26 which is compressed by the plug 14. The force is applied to the blade on the side of the bridging bar opposite to the cutting head 21 to thereby urge the head outwardly to cutting position as illustrated in FIG. 1. In this position the flat web 27 of the notch 23 engages the flat surface of the bridging bar 18, while the end 28 of the notch pivots on the upper sharp edge of the bridging bar 18 when the cutting head 21 is moved inwardly as the blade passes through an aperture of a workpiece which is to be deburred. The degree of outward movement of head 21 is controlled by the engagement of the flat surface of the bar 18 and the web 27 of the aperture 23 and by the projecting finger 22 of the blade which engages the forward portion of the plunger 25. Through the adjustment of the plug 14 within the threaded aperture 13, the pressure on the spring is changed and therefore on the head 21 so that assurance is had that the head will be maintained outwardly in cutting position when the end of an aperture is being deburred. By backing off or removing the plug 14, the blade 19 may be quickly removed from the slot 15. The head end of the blade is pivoted rearwardly to have the lower front portion of the notch clear the bar whereupon the blade may be moved upwardly and rearwardly from the slot 15 when it is to be sharpened or a new blade is to be employed. When assembling the blade on bar 18, the blade is placed in the slot 15 with the end 28 of the notch 23 in contact with the upper end of the bar 18 about which the blade is pivoted to have the head 21 extend from the forward or cutting side of the body 11. Through the application of the plug 14 within the aperture 13 to a degree to produce the proper tension on the spring 26, the blade is locked upon the bridging bar 18 within the slot 15.

The blade is herein illustrated as having a bottom cutting edge 31 and a top cutting edge 32. The bottom cutting edge 31 cuts the burr from the top of the aperture before the cutting edge 31 is inserted through the aperture. Thereafter the upward movement of the tool will cause the edge 32 to cut the burr from the bottom edge of the aperture. Each of the cutting edges 31 and 32 is relieved at the end 33, and the forward face is relieved at 34 to produce a positive rake to the cutting edges 31 and 32.

What is claimed is:

1. In a deburring tool, a cylindrical body having a central aperture extending inwardly from one end, a slot extending through the body at the opposite end in communication with said aperture, a bar bridging the slot along the cutting side of the body, a blade having a cutting head and a notch extending inwardly from a side edge, said blade being disposed in said slot with the notch hooked over said bar about which the blade pivots, and means for pivoting said blade to have the cutting end move outwardly of the body into cutting position.

2. In a deburring tool, a cylindrical body having a central aperture extending inwardly from one end, a slot extending through the body at the opposite end in communication with said aperture, a bar bridging the slot along the cutting side of the body, a blade having a cutting head and a notch extending inwardly from a side edge, said blade being disposed in said slot with the notch hooked over said bar about which the blade pivots, means for pivoting said blade to have the cutting end move outwardly of the body into cutting position, said pivoting means comprising a plunger in said aperture engaging the end of the blade, a spring in said aperture engaging said plunger, and means engaging the opposite end of said spring for adjusting the tension thereof.

3. In a deburring tool, a body having a slot extending therethrough at one end, a bridging bar extending across said slot at one side of the body, a cutting blade in said slot having a cutting edge at one end and a notch extending inwardly from one side edge which is hooked over said bar, and means for urging the blade to rock about said bar for moving said cutting edge outwardly of the body into cutting position.

4. In a deburring tool, a body having a slot extending therethrough at one end, a bridging bar extending across said slot at one side of the body, a cutting blade in said slot having a cutting edge at one end and a notch extending inwardly from one side edge which is hooked over said bar, means for urging the blade to rock about said bar for moving said cutting edge outwardly of the body into cutting position, and stop means for limiting the outward movement of said cutting edge.

5. In a deburring tool, a body having a central aperture containing a thread, a slot extending through said body at the opposite end thereof communicating with said aperture, a bridging bar extending across said aperture, a cutting blade having a cutting head at one end and a slot projecting inwardly from the side of the body which extends over said bar, a plunger within said aperture, a spring within said aperture, and a threaded plug within said aperture engaging the spring which is tensioned through the adjustment of the plug on the thread within the aperture, said plunger engaging the end of said cutting blade rearwardly of the bar for applying a pressure for urging the cutting head outwardly of the slot into cutting position.

6. In a deburring tool, a body having a central aperture containing a thread, a slot extending through said body at the opposite end thereof communicating with said aperture, a bridging bar extending across said aperture, a cutting blade having a cutting head at one end and a slot projecting inwardly from the side of the body which extends over said bar, a plunger within said aperture, a spring within said aperture, a threaded plug within said aperture engaging the spring which is tensioned through the adjustment of the plug on the thread within the aperture, said plunger engaging the end of said cutting blade rearwardly of the bar for applying a pressure for urging the cutting head outwardly of the slot into cutting position, and stop means on the end of the blade opposite to that contained in the cutting head which engages the side of said plunger and limits the degree to which the head is extended from the tool body.

7. A cutting blade for a deburring tool, said blade having an extending body with a cutting head on one end and a stop finger on the opposite end, and a notch along one edge of said body, the end on said blade opposite to that having the cutting head extending rearwardly of a line through the cutting edge and said notch.

References Cited in the file of this patent
UNITED STATES PATENTS
2,620,689    Cogsdill _____ Dec. 9, 1952